United States Patent
Park et al.

(10) Patent No.: US 6,503,661 B1
(45) Date of Patent: Jan. 7, 2003

(54) LITHIUM SECONDARY BATTERY

(75) Inventors: Chi-kyun Park, Flanders, NJ (US); Archana Kakirde, Lake Hiawatha, NJ (US); Peikang Liu, Mt. Olive, NJ (US); Venkatesan Manivannan, Parsippany, NJ (US); Chul Chai, Saddle River, NJ (US); Dong-joon Ihm, Chonan (KR); Jon-ha Lee, Chonan (KR)

(73) Assignee: SKC Co., Ltd. (KR)

( * ) Notice: Subject to any disclaimer, the term of this patent is extended or adjusted under 35 U.S.C. 154(b) by 79 days.

(21) Appl. No.: 09/629,950

(22) Filed: Aug. 1, 2000

(30) Foreign Application Priority Data

Aug. 5, 1999 (KR) .............................. 99-32143

(51) Int. Cl.$^7$ ..................... H01M 6/18; H01G 35/00
(52) U.S. Cl. ................ 429/306; 429/319; 429/304; 252/62.2
(58) Field of Search ................ 429/306, 304, 429/319, 316, 303, 309, 249, 320; 252/62.2

(56) References Cited

U.S. PATENT DOCUMENTS

| | | | | | |
|---|---|---|---|---|---|
| 5,728,489 | A | * | 3/1998 | Gao et al. | 429/192 |
| 6,001,509 | A | * | 12/1999 | Kim et al. | 429/309 |
| 6,218,051 | B1 | * | 4/2001 | Yokohata | 429/249 |

* cited by examiner

Primary Examiner—Stephen Kalafut
Assistant Examiner—R Alejandro
(74) Attorney, Agent, or Firm—Nixon & Vanderhye P.C.

(57) ABSTRACT

A composition for forming polymer electrolyte and a lithium secondary battery employing the polymer electrolyte prepared using the composition are provided. The composition for forming polymer solid electrolyte having a polymer resin, a plasticizer, a filler and a solvent, wherein the filler is synthetic zeolite having an affinity for an organic solvent or moisture. Therefore, the mechanical strength and ionic conductivity can be improved by adding synthetic zeolite as a filler when forming polymer electrolyte. Also, use of such polymer electrolyte makes it possible to prepare lithium secondary batteries having good high-current discharge characteristics and excellent discharge capacity characteristics even under repeated charge/discharge conditions.

8 Claims, 3 Drawing Sheets

LITHIUM SECONDARY BATTERY

BACKGROUND OF THE INVENTION

1. Field of the Invention

The present invention relates to a lithium secondary battery, and more particularly, solid polymer electrolyte having improved ionic conductivity and mechanical strength and a lithium secondary battery employing the same.

2. Description of the Related Art

As portable electric and electronic devices tend to pursue high performance and miniaturization, there has been increasing demand for high-performance secondary batteries, and a great attention has been paid to thus lithium secondary batteries as next generation batteries.

According to the kind of electrolyte used, lithium secondary batteries are classified into lithium ion batteries using liquid electrolyte and lithium ion polymer battery using polymer solid electrolyte. Since the lithium ion polymer battery using solid electrolyte is free of danger of leakage of an electrolytic solution and has excellent processability, it can be made a battery pack. Also, the lithium ion polymer battery is lightweight while not being bulky, and has a very small discharge rate. Due to such characteristics, lithium ion polymer batteries are safer than lithium ion batteries and can be easily manufactured into angular batteries or large-sized batteries.

The solid electrolyte of a lithium ion polymer battery include pure-solid polymer electrolyte, gel-type polymer solid electrolyte, hybrid polymer electrolyte and the like.

The pure solid polymer electrolyte produces a thin film by a solvent evaporation coating method, and examples thereof include polyether graft polyether electrolyte, polysiloxane electrolyte and the like. The ionic conductivity of such electrolyte is based on the local segmental motion of polymer.

The gel-type polymer solid electrolyte that produces a polymer host structure and a stable cell by adding an electrolytic solution to a polymer matrix, has better ionic conductivity characteristics at room temperature but poorer mechanical properties than the pure solid polymer electrolyte. In order to make up for the weakness in the mechanical property of the gel-type polymer solid electrolyte, crosslinking or thermosetting materials are generally further added in preparing electrolytes. The ionic conductivity of the polymer solid electrolyte is based on the mobility of ion species in an electrolytic solution.

Examples of the gel-type polymer solid electrolyte include an electrolyte prepared by mixing ethylene glycol with dimethacrylate and irrradiating UV rays into the mixture. This electrolyte exhibits excellent flexibility but is liable to be hardened by heat after UV irradiation, which makes further processing impossible. In the case of fabricating a battery using the polymer electrolyte, the interface resistance between an electrode and electrolyte increases, resulting in difficulty of putting into practice.

Another example of gel-type polymer solid electrolyte includes a crosslinked polyethyleneoxide electrolyte, which is prepared by crosslinking polyethyleneoxide to reduce crystallinity. As a result, the ionic conductivity of the electrolyte can be improved to the maximum of $10^{-5}$ S/cm, which is still unsatisfactory to be used as a room-temperature type lithium secondary battery.

Another example of gel-type polymer solid electrolyte includes electrolyte using polyacrylonitrile, which is prepared by dissolving polyacrylonitrile in an electrolytic solution and making a gel with the temperature of the resultant structure further reduced. The thus obtained electrolyte has a poor mechanical strength and is not uniform in view of impregnation of an electrolytic solution and distribution of lithium salts, resulting in reduction of electrical characteristics, while exhibiting excellent ionic conductivity of $10^{-3}$ S/cm.

Hybrid polymer electrolyte is prepared by injecting an electrolytic solution into a porous polymer matrix having fine pores of less than submicron dimension, by which the possibility of commercializing lithium ion polymer batteries has become maximized. However, the hybrid polymer electrolyte requires a large amount of organic solvent such as acetone in manufacturing a polymer matrix and a refining facility for recycling used organic solvent is necessary. Also, such a characteristic as ionic conductivity is very sensitive to the content of the electrolytic solution impregnated into the polymer matrix.

As described above, in the case of using the gel-type polymer electrolyte and the hybrid polymer electrolyte, the polymer matrix must impregnate a large amount of electrolytic solution to obtain a good ionic conductivity characteristic. However, existing polymer electrolytes are not still satisfiable in view of ionic conductivity and mechanical property.

SUMMARY OF THE INVENTION

To solve the above problems, it is a first object of the present invention to provide a composition for forming polymer electrolyte having improved ionic conductivity and mechanical property.

It is a second object of the present invention to provide a lithium secondary battery employing a polymer electrolyte formed using the composition for forming the polymer electrolyte.

To achieve the first object of the present invention, there is provided a composition for forming polymer solid electrolyte having a polymer resin, a plasticizer, a filler and a solvent, wherein the filler is synthetic zeolite having an affinity for an organic solvent or moisture.

To achieve the second object of the present invention, there is provided a lithium secondary battery having a cathode, an anode and polymer electrolyte interposed between the cathode and the anode, wherein the polymer electrolyte is formed by coating a composition for forming polymer electrolyte comprising a polymer resin, a plasticizer, a filler and a solvent, on a base and then dried the resultant structure, and the filler is synthetic zeolite having an affinity for an organic solvent or moisture.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
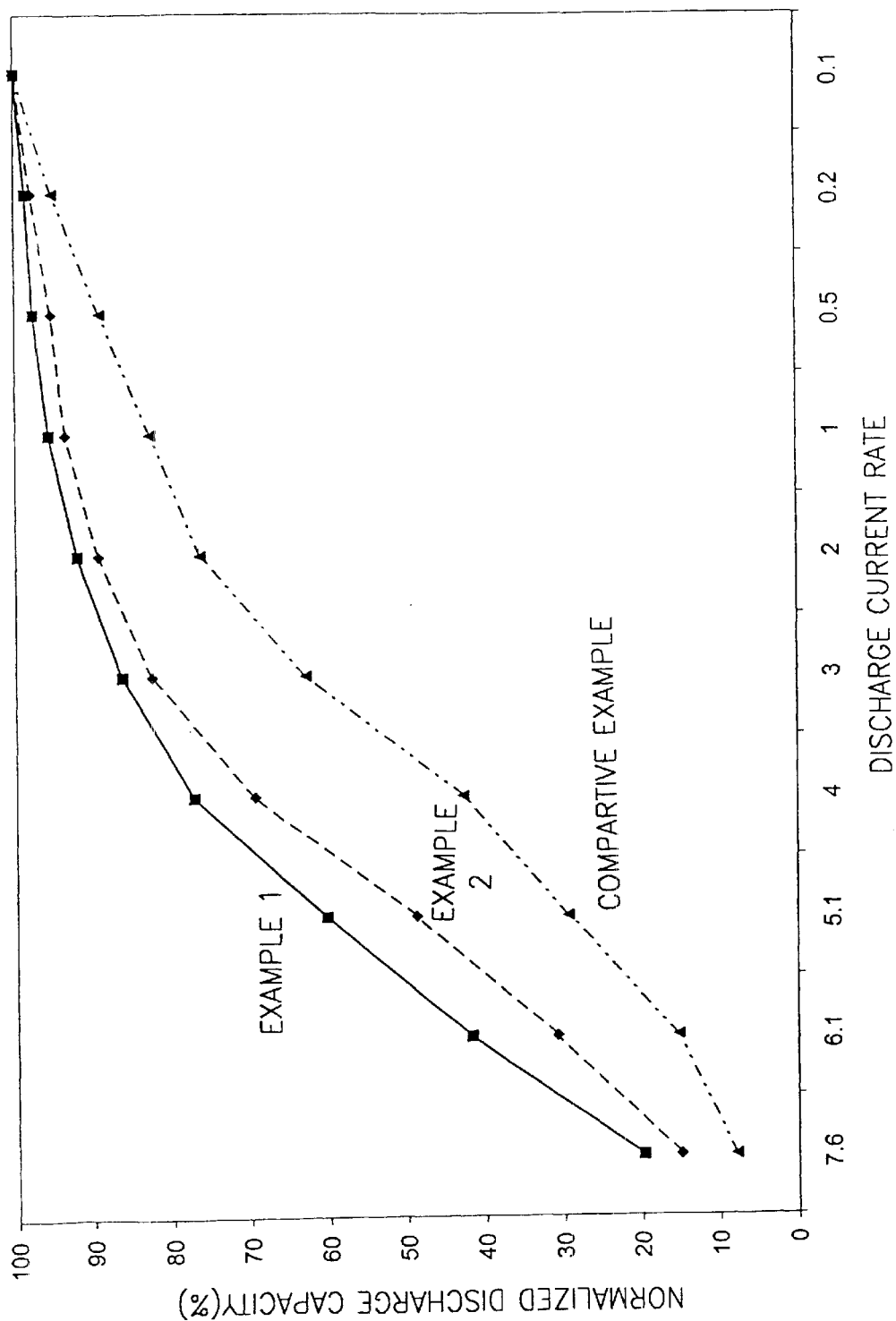
FIG. 1 illustrates high current discharge characteristics of a lithium secondary battery employing polymer electrolyte according to the present invention.

The feature of the present invention lies in that synthetic zeolite (trade name: molecular sieve) having a great affinity for an organic solvent or moisture is added when preparing polymer solid electrolyte, thereby improving the ionic conductivity and mechanical strength of the electrolyte.

The synthetic zeolite has a micro-porous structure having pores of 0.5 to 1 nm, and examples thereof include sodium aluminosilicate, aluminosilicate, aluminophosphate and the like.

A composition for forming the polymer solid electrolyte of the present invention includes a polymer resin, a plasticizer, a filler and a solvent.

A fluoride-based resin is preferably used as the polymer resin, and examples of specific fluoride-based resin include polyvinylidenefluoride (PVdF), VdF-HFP copolymer A in which HFP is contained in an amount of greater than 0 and less than 8% by weight, a mixture of VdF-HFP copolymer A and PVdF, and a mixture of VdFHFP copolymer A and VdF-HFP copolymer B in which HFP is contained in an amount of greater than 0 and less than or equal to 15% by weight. Here, VdF-HFP copolymer A and PVdF are preferably mixed in a ratio of 99.99:0.01~50:50 by weight, and VdF-HFP copolymer A and VdF-HFP copolymer B are preferably mixed in a ratio of 99.99:0.01~30:70 by weight. If the content of VdF-HFP copolymer A with respect to VdF-HFP copolymer B or PVdF is beyond the above range, the performance enhancing effect at a high temperature of about 60° C. is undesirably poor. Here, the content of the polymer resin is 10 to 40 parts by weight based on the total weight of the composition for forming the polymer electrolyte, that is, 100 parts by weight. Here, if the content of the polymer resin is less than 10 parts by weight, the polymer resin is brittle. If the content of the polymer resin is greater than 40 parts by weight, the high-current discharge characteristic of a battery is undesirably weakened.

The plasticizer is not specifically restricted, and at least one selected from the group consisting of an ethylene glycol derivative, an oligomer or polymer thereof and dibutyl phthalate, is used as the plasticizer. Here, examples of the ethylene glycol derivative include ethylene glycol diacetate, ethylene glycol dibutylether, ethylene glycol dibutyrate, and ethylene glycol dipropionate. Examples of the polymer of the ethylene glycol derivative include polyethylene glycol dialkyl (R) ester and polyethylene glycol diaryl (R') ester. Here, R is a $C_1$ to $C_{12}$ aliphatic hydrocarbon group, and R' is a $C_6$ to $C_{12}$ aromatic hydrocarbon group. Here, the content of the plasticizer is 10 to 70 parts by weight based on the total weight of the composition for forming polymer electrolyte, that is, 100 parts by weight. Here, if the content of the plasticizer is less than 10 parts by weight, the high-current discharge characteristic of a battery is undesirably weakened. If the content of the polymer resin is greater than 70 parts by weight, the mechanical strength of a polymer film is undesirably reduced.

Any material that is generally used in forming polymer electrolyte can be used, and the content thereof is the remainder obtained by subtracting the sum of the contents of the polymer resin, the plasticizer and the filler from the content of the composition for forming a polymer electrolyte.

Synthetic zeolite (trade name: molecular sieve) is preferably used as the filler, as described above. The synthetic zeolite is divided into one having an affinity for an organic solvent, e.g., sodium aluminum silicate, and one having an affinity for moisture, e.g., aluminosilicate or aluminophosphate. The content of the filler is preferably 10 to 75 parts by weight based on the total weight of the composition for forming polymer solid electrolyte, i.e., 100 parts by weight. If the content of the filler is less than 10 parts by weight, the enhancement effects of the mechanical strength and ionic conductivity are negligible. If the content of the polymer solid electrolyte is greater than 75 parts by weight, the polymer film is undesirably brittle.

A method for preparing polymer electrolyte using the composition for forming polymer solid electrolyte and a lithium secondary battery employing the same, will now be described with reference to FIG. 1.

First, an anode active material composition is coated on an anode current collector and dried to form an anode. Here, a copper foil or a copper mesh is used as the anode current collector. The anode active material composition includes an anode active material, a conductive agent, a binder, a plasticizer and a solvent. Here, any materials that are generally used for lithium secondary batteries can be used as the anode active material, the conductive agent, the binder, the plasticizer and the solvent, and the amounts thereof are the same as those used in conventional lithium secondary batteries.

Examples of the anode active material include carbon, graphite and the like, and the content thereof is preferably 56 to 84 parts by weight. If the content of the electrode active material is beyond the above range, the capacity characteristics are undesirably deteriorated. Examples of the conductive agent include carbon black and the content there of is 1 to 5 parts by weight. If the content of the conductive agent is less than 1 part by weight, the conductivity enhancing effect of the anode active material layer is negligible. If the content of the conductive agent is greater than 5 parts by weight, the content of the anode active material relative to that of the conductive agent is undesirably reduced. Examples of the binder include PVdF, VdF-HFP copolymer A, a mixture of VdF-HFP copolymer A and VdF-HFP copolymer B, a mixture of VdF-HFP copolymer A and PVdF and the like, as described above. Here, the content of the binder is 5 to 14 parts by weight. If the content of the binder is less than 5 parts by weight, the bonding force between components in the anode active material becomes weak. If the content of the binder is greater than 14 parts by weight, the content of the anode active material relative to that of the binder is undesirably reduced. Usable examples of the solvent include N-methylpyrrolidone (NMP), dimethylformamide (DMF), a ketone-based solvent, a mixture thereof and the like, and the content thereof is 50 to 300 parts by weight. Here, examples of the ketone-based solvent include acetone, cyclohexanone, cyclopentanone and the like. If the content of the solvent is less than 50 parts by weight, the components contained in the composition for forming the anode active material are not completely dissolved. If the content of the solvent is greater than 300 parts by weight, coating of the composition is quite difficult.

The plasticizer is not specifically restricted and the same material as that used in forming polymer electrolyte can be used, and the content thereof is preferably 5 to 28 parts by weight. If the content of the plasticizer is less than 5 parts by weight, the effect owning to addition of the plasticizer is negligible. If the content of the plasticizer is greater than 28 parts by weight, the content of the anode active material relative to that of the plasticizer is undesirably reduced, and the mechanical properties of the anode are deteriorated.

A cathode active material composition is coated on a cathode current collector and dried to form a cathode. Here, an aluminum mesh or an aluminum foil is used as the cathode current collector. The cathode active material composition includes a cathode active material, a conductive agent, a binder, a plasticizer and a solvent, which are substantially the same as those of the anode, except the cathode active material.

Lithium oxide such as $LiCoO_2$, $LiNiO_2$, $LiMn_2O_4$, is used as the cathode active material, and the content thereof is 60 to 86 parts by weight. If the content of the cathode active material is beyond the above range, the capacity characteristics of the cathode are undesirably deteriorated.

Separately from the above, a polymer resin, a plasticizer, a filler and a solvent are sufficiently mixed to prepare a composition for forming polymer electrolyte. Then, the resultant structure is cast on a support structure, e.g., a polyethyleneterephthalate film, and then dried. Subsequently, the polymer film is peeled off from the support to form polymer electrolyte. Here, the thickness of polymer electrolyte is preferably 20 to 50 $\mu$m. If the thickness of polymer electrolyte is beyond the above range, the capacity characteristics of a battery are undesirably deteriorated.

Next, the thus formed anode, polymer electrolyte and cathode are laminated to form an electrode structure.

Then, the plasticizer is removed from the electrode structure. The plasticizer is preferably removed by an extraction process using an organic solvent such as ether or alcohol or an extraction process under a vacuum condition. In the case of using the vacuum extraction process, the pressure is preferably in the range of 20 to $10^{-3}$ torr and the temperature is preferably in the range of 40 to 130° C. Here, if the temperature during the vacuum drying step is lower than 40° C., it is difficult to completely remove the plasticizer. If the temperature is higher than 130° C., an organic solvent in the composition for forming an electrode active material such as the plasticizer, may be undesirably deformed. When the plasticizer is removed under a vacuum condition, a material removable at 130° C. or below in temperature and 20 to $10^{-3}$ torr in pressure, e.g., ethylene glycol diacetate, must be used.

The plasticizer is removed from the electrode structure in the above-described manner and then an electrolytic solution is injected to the electrode structure, thereby completing a lithium secondary battery. Here, the electrolytic an solution consists of an organic solvent and a lithium salt. The organic solvent is at least one selected from the group consisting of propylene carbonate (PC), ethylene carbonate (EC), y-butyrolactone, 1,3-dioxolane, dimethoxyethane, dimethylcarbonate (DMC), diethylcarbonate (DEC), methylethylcarbonate (MEC), tetrahydrofuran (THF), dimethylsulfoxide and polyethylene glycol dimethylether. The amount of the solvent is the same as that used in conventional lithium secondary batteries.

The lithium salt is not specifically restricted and a lithium compound which is dissociated from the organic solvent to produce lithium ions can be used. Examples of specific lithium salts include at least one ionic lithium salt selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethansulfonyl amide (LiN($CF_3SO_2$)$_2$). The amount of the lithium salt is the same as that used in conventional lithium secondary batteries. When the organic electrolytic solution containing such an inorganic salt is injected into the electrode structure, it serves as a path along which lithium ions move in the direction of current.

As described above, when manufacturing the electrode structure by laminating electrodes and polymer electrolyte, a thermal lamination method may be used. However, a direct coating method can be used by appropriately adjusting the solvent system of the composition for forming an electrode and the composition for forming polymer electrolyte. In particular, if ethylene glycol diacetate is used as a plasticizer, the direct coating method, rather than the lamination method, is preferably used. This is because, if the conventional lamination method is used, ethylene glycol diaceterate, having a considerably low boiling point, may be partially evaporated, resulting in deformation in the composition and shape of the battery.

The direct coating method will now be described briefly. First, an electrode active material composition is directly coated on an electrode current collector and dried to form an electrode plate. The composition for forming polymer electrolyte is directly coated on the thus formed electrode, dried to form polymer electrolyte, and then pressed to prepare an electrode structure. In such a manner, the direct coating method greatly simplifies the manufacturing process compared to the lamination method.

The present invention will now be described through the following examples and is not limited thereto.

EXAMPLE 1

150 g of a VdF:HFP copolymer (Kynar Flex 2801) was mixed with 800 g of acetone, 400 g of cyclohexanone and 250 g of ethylene glycol diacetate. To the mixture were added 15 g of acetylene black (Chevron Chemical Company) and 700 g of mesophase microbeads (MCMB) 25–28 (Osaka Gas Co., Ltd.) and sufficiently mixed to prepare an anode active material slurry. The anode active material slurry was coated on both surfaces of a copper mesh using a die coater, dried and pressed to prepare a 280-$\mu$m-thick anode.

200 g of a VdF:HFP copolymer (Kynar Flex 2801) was mixed with 1400 g of acetone, 600 g of cyclohexanone and 300 g of ethylene glycol diacetate. To the mixture were added 70 g of acetylene black (Chevron Chemical Company) and 1300 g of $LiCoO_2$ (Seimi Chemical Co., Ltd.) and sufficiently mixed to prepare a cathode active material slurry.

The cathode active material slurry was coated on both surface of an aluminum mesh using a die coater, dried and pressed to prepare a 280 $\mu$m thick cathode.

150 g of a VdF:HFP copolymer (Kynar Flex 2801) was mixed with 600 g of acetone, 400 g of cyclohexanone and 250 g of ethylene glycol diacetate. To the mixture was added 350 g of a molecular sieve (Aldrich Chemical Company) having a particle diameter of 100 $\mu$m and having an affinity for an organic solvent, and sufficiently mixed to prepare a slurry for forming a polymer electrolyte.

The polymer electrolyte forming slurry was coated on both surfaces of the anode using a die coater, dried and pressed to prepare a 60-$\mu$m-thick polymer electrolyte. The polymer electrolyte forming slurry was further coated on the polymer electrolyte using a die coater and then the cathode was closely mounted thereon so that the distance between cathodes was less than 5 mm, and then dried. Subsequently, the obtained electrode plate was cut into a predetermined size to prepare a bicell.

Subsequently, ethylene glycol diacetate was completely removed from the bicell and then dried under a vacuum condition of approximately 65° C. and $10^{-1}$ torr.

Thereafter, the obtained cell was put into a plastic case which can be sealed by heat. Then, an electrolytic solution (1M LiPF$_6$ in a mixture of EC:DMC:DEC in a ratio of 1:1:1) was injected into the resultant structure under an argon gas atmosphere, thereby completing a lithium secondary battery.

EXAMPLE 2

A lithium secondary battery was prepared by the same procedure as in Example 1 except that a molecular sieve having an affinity for moisture was used instead of a molecular sieve having an affinity for an organic solvent.

COMPARATIVE EXAMPLE

A lithium secondary battery was prepared by the same procedure as in Example 1 except that silica was used instead of the molecular sieve.

Figure 2:
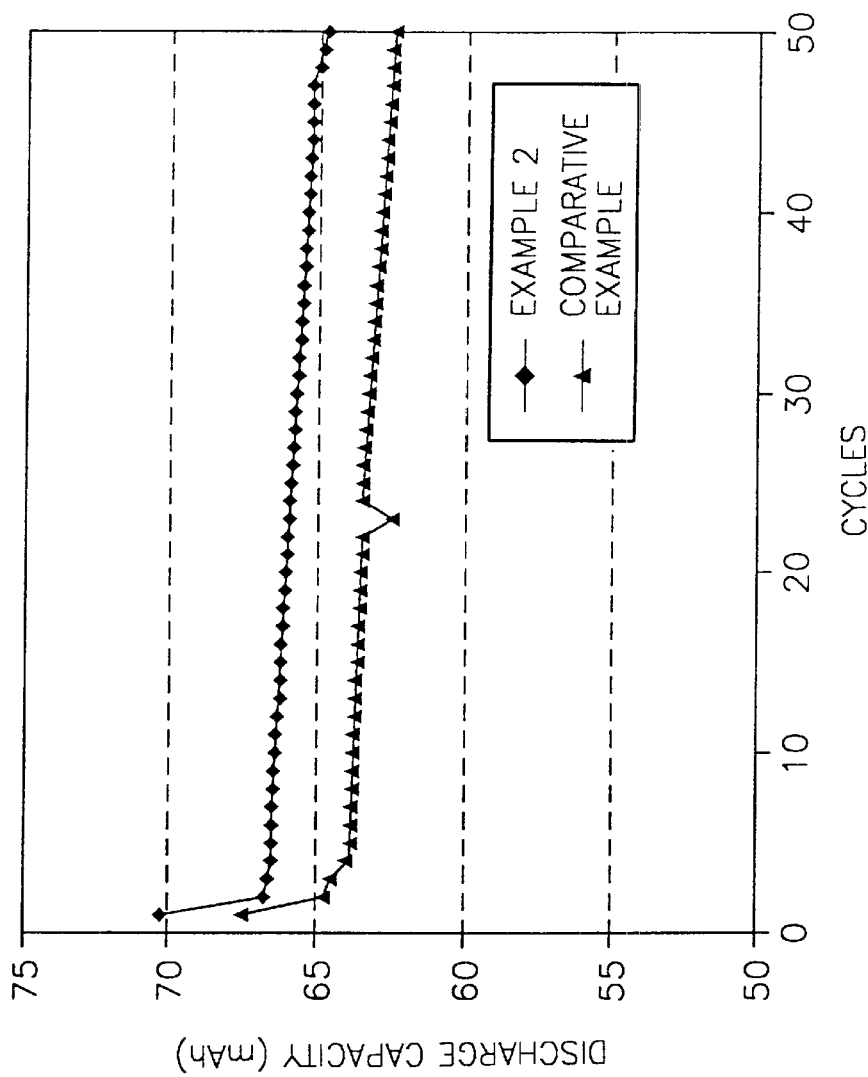
FIG. 2 illustrates a change in the discharge capacity under repeated charge/discharge cycles in lithium secondary batteries prepared by Example of the present invention and Comparative Example.

High-current discharge characteristics and cycle characteristics of lithium secondary batteries prepared by Examples 1 and 2 and Comparative Example were examined and the result is shown in FIGS. 1 and 2, respectively.

Referring to FIG. 1, it is confirmed that the lithium secondary batteries prepared by Examples 1 and 2 have better high-current discharge characteristics than the lithium secondary battery prepared by Comparative Example.

As shown in FIG. 2, the discharge capacity characteristics of the lithium secondary battery prepared by Example 2 under repeated charge/discharge conditions were better than those of the lithium secondary battery prepared by Comparative Example. Although not shown in FIG. 2, it was confirmed that the battery prepared by Example 1 has substantially the same discharge capacity as that of the battery prepared by Example 2 under repeated charge/discharge conditions.

Figure 3:
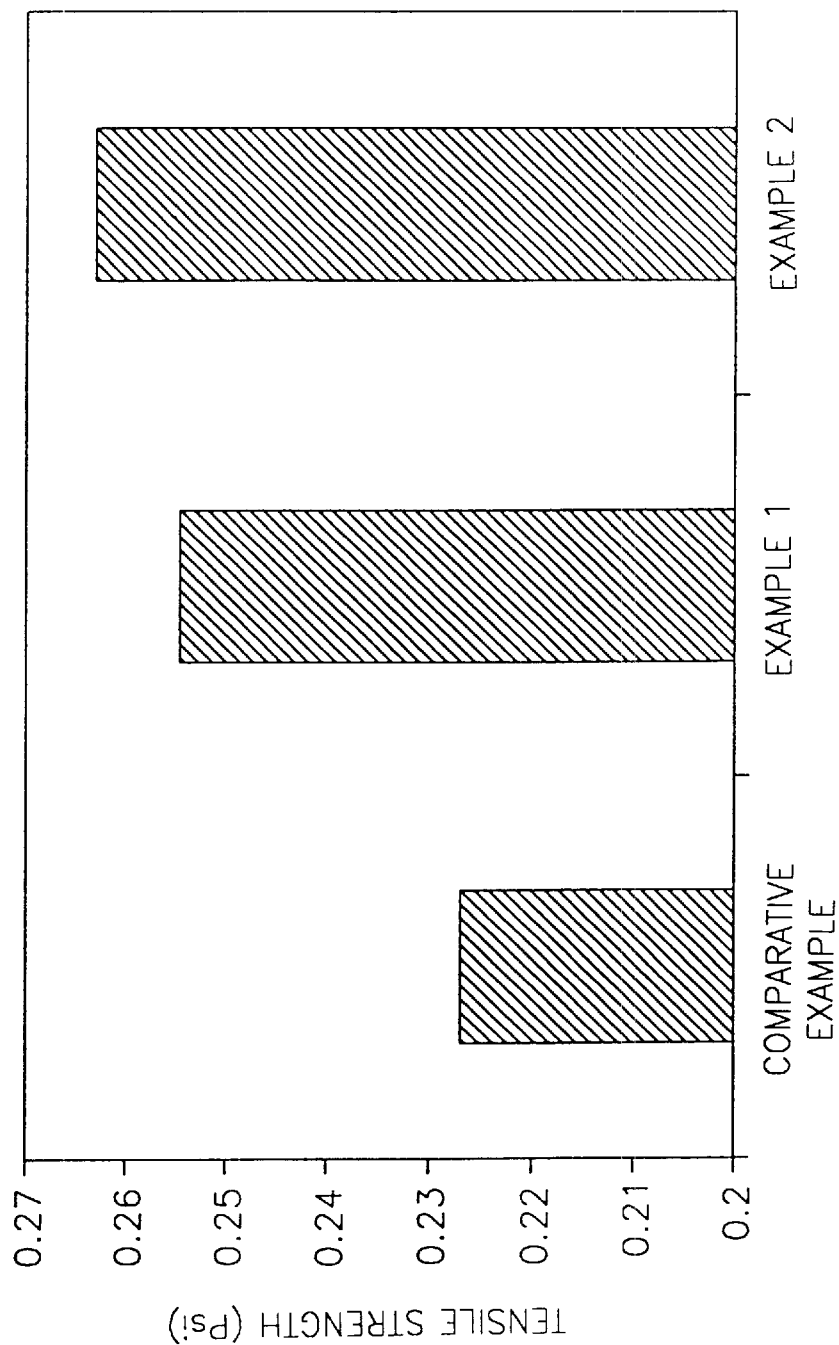
FIG. 3 illustrates tensile strength characteristics of a lithium secondary battery according to the present invention.

Tensile strengths of polymer electrolytes prepared by Examples 1–2 and Comparative Example were measured and the measurement results are shown in FIG. 3.

Referring to FIG. 3, it is confirmed that, when the molecular sieve having an affinity for an organic solvent was used as the filler (Example 1) and when the molecular sieve having an affinity for moisture was used (Example 2), the tensile strengths were greatly enhance compared to the case when only silica was used as the filler (Comparative Example). In particular, the lithium secondary battery prepared by Example 2 has the highest tensile strength.

As described above, the mechanical strength and ionic conductivity can be improved by adding synthetic zeolite as a filler when forming polymer electrolyte. Also, use of such polymer electrolyte makes it possible to prepare lithium secondary batteries having good high-current discharge characteristics and excellent discharge capacity characteristics even under repeated charge/discharge conditions.

What is claimed is:

1. A lithium secondary battery having a cathode, an anode and a polymer electrolyte interposed between the cathode and the anode, wherein the polymer electrolyte is a dried coating of a polymer electrolyte-forming composition comprising a polymer resin, a plasticizer, a filler and a solvent, and wherein the filler is a synthetic zeolite having an affinity for moisture and is at least one selected from the group consisting of aluminosilicate and aluminophosphate.

2. The lithium secondary battery according to claim 1, wherein the content of the filler is 10 to 75 parts by weight based on the total weight of the polymer electrolyte-forming composition.

3. The lithium secondary battery according to claim 1, wherein the polymer resin of the polymer electrolyte-forming composition is at least one selected from the group consisting of polyvinylidenefluoride (PVdF), a vinylidene fluoride-hexafluoropropylene (VdF-HFP) copolymer A having a hexafluoropropylene (HFP) content of greater than 0 and less than 8% by weight, a mixture of VdF-HFP copolymer A and PVdF, and a mixture of VdF-HFP copolymer A and a vinylidene fluoride-hexafluoropropylene (VdF-HFP) copolymer B having a hexafluoropropylene (HFP) content of greater than 0 and less than or equal to 15% by weight.

4. A lithium secondary battery comprising:
   a cathode;
   an anode; and
   a solid polymer electrolyte interposed between the cathode and the anode, wherein
   said solid polymer electrolyte includes a polymer resin, a plasticizer, and at least one synthetic zeolite having an affinity for moisture selected from the group consisting of aluminosilicate and aluminophosphate.

5. The lithium secondary battery as in claim 4, wherein said solid polymer electrolyte is a dried layer of a solvated composition which comprises said polymer resin, said plasticizer, and said at least one synthetic zeolite.

6. The lithium secondary battery as in claim 5, wherein said at least one synthetic zeolite is present in said solvated composition in an amount, based on total weight of the solvated composition, of 10 to 75 parts by weight.

7. The lithium secondary battery as in claim 4, 5 or 6, wherein said solid polymer electrolyte has a thickness of 20 to 50 μm.

8. The lithium secondary battery according to claim 4, wherein the polymer resin is at least one selected from the group consisting of polyvinylidenefluoride (PVdF), a vinylidene fluoride-hexafluoropropylene (VdF-HFP) copolymer A having a hexafluoropropylene (HFP) content of greater than 0 and less than 8% by weight, a mixture of VdF-HFP copolymer A and PVdF, and a mixture of VdF-HFP copolymer A and a vinylidene fluoride-hexafluoropropylene (VdF-HFP) copolymer B having a hexafluoropropylene (HFP) content of greater than 0 and less than or equal to 15% by weight.

* * * * *